(12) United States Patent
Ding (10) Patent No.: US 8,231,031 B2
(45) Date of Patent: Jul. 31, 2012

(54) LOTION PUMP AND ONE-WAY VALVE INCORPORATED THEREIN

(76) Inventor: Yaowu Ding, Taixing (CN)

( * ) Notice: Subject to any disclaimer, the term of this patent is extended or adjusted under 35 U.S.C. 154(b) by 449 days.

(21) Appl. No.: 12/526,439

(22) PCT Filed: Feb. 17, 2007

(86) PCT No.: PCT/CN2007/000593
§ 371 (c)(1),
(2), (4) Date: Aug. 7, 2009

(87) PCT Pub. No.: WO2008/101368
PCT Pub. Date: Aug. 28, 2008

(65) Prior Publication Data
US 2010/0006604 A1 Jan. 14, 2010

(51) Int. Cl.
*B65D 88/54* (2006.01)
(52) U.S. Cl. .................................. 222/321.9; 222/320
(58) Field of Classification Search ............... 222/231.9, 222/231.7, 211–213, 206, 207, 153.13, 321.9, 222/321.7, 321.1, 320, 209, 494–497, 402.1, 222/402.13, 190
See application file for complete search history.

(56) References Cited

U.S. PATENT DOCUMENTS

| 4,262,823 A | * | 4/1981 | Monden ...................... 222/321.9 |
| 4,607,764 A | * | 8/1986 | Christine ...................... 222/207 |
| 4,739,906 A | * | 4/1988 | LoTurco ...................... 222/212 |
| 4,846,810 A | | 7/1989 | Gerber |
| 5,014,881 A | * | 5/1991 | Andris ...................... 222/207 |
| 5,339,972 A | * | 8/1994 | Crosnier et al. ............... 215/320 |
| 5,544,789 A | * | 8/1996 | Gillingham ............... 222/153.13 |
| 5,704,519 A | * | 1/1998 | Crosnier et al. ............... 222/207 |
| 5,906,301 A | * | 5/1999 | Foster ...................... 222/383.1 |
| 6,006,949 A | * | 12/1999 | Foster et al. ............. 222/153.13 |
| 6,234,363 B1 | * | 5/2001 | Stradella .................. 222/402.12 |
| 7,243,682 B2 | * | 7/2007 | Brandes ...................... 137/853 |

FOREIGN PATENT DOCUMENTS

| CN | 2483350 | 3/2002 |
| CN | 2497877 | 7/2002 |
| JP | 49-034412 | 3/1974 |
| JP | 7-42438 | 8/1995 |
| JP | 2000-354803 | 12/2000 |

OTHER PUBLICATIONS

International Search Report of PCT/CN2007/000593, dated Nov. 29, 2007.

* cited by examiner

*Primary Examiner* — Lien Ngo
(74) *Attorney, Agent, or Firm* — Hamre, Schumann, Mueller & Larson, P.C.

(57) ABSTRACT

A lotion pump may include an upper one-way valve. The one-way valve may include an elastic tube and a valve seat. The valve seat is disposed on the connecting/guiding member or the nozzle head and has a closed top end and at least one opening provided on a side surface, and the elastic tube elastically covers the side surface of the valve seat. The one way valve may include an open state and a closed state. In the open state, the elastic tube expands to open the opening; and in the closed state, the elastic tube closes the opening. The lotion pump may be connected to a liquid container that is fixed to a fixture.

4 Claims, 12 Drawing Sheets

LOTION PUMP AND ONE-WAY VALVE INCORPORATED THEREIN

FIELD OF THE INVENTION

This invention relates generally to a lotion pump, and more particularly to a spring-less lotion pump and a one-way valve incorporated therein.

BACKGROUND ART

In the lotion pumps of the prior art, there commonly exist the following problems.

Firstly, all of the existing lotion pumps have a metal spring therein, which is inconvenient for a used pump to be recycled. That is, when a used lotion pump is recycled, it is necessary to disassemble the head of the pump so as to separately recycle the metal spring and the plastic components. In fact, it is seldom to do so since it is inconvenient to take the spring out of the pump. This is disadvantageous to wastes recycle and environment protection.

Secondly, in an existing lotion pump, its one-way valve is mainly of two types. In one type, an upper one-way valve is composed of a piston, a piston head and a connecting/guiding member. In another type, the upper one-way valve is composed of a piston and a ball. In the former case, precision requirements for the three parts, i.e., the piston, piston head and housing, are very high. If their precision does not meet a given requirement, it trends to cause the problems such as many ineffective press times, uncomfortable hand feeling and leakage. In the latter case, it is not leak-proof while the nozzle head is in an opened condition. Moreover, in the case that a lotion pump is applied to a highly viscous lotion, the ball in the pump is possible to adhere onto the inner wall and not to properly sit down after its upward stroke, and thereby rendering the pump inoperative.

Furthermore, in the case of a spray pump, in order to reach a better atomization, it is necessary to have a high internal pressure from the start of a spray through its whole process, the higher the internal pressure, the better the atomization effect. In an existing spray pump, where a one-way valve composed of a piston, a piston head and a connecting/guiding member is incorporated, a small spring is disposed above the piston. When the internal pressure is not high enough, the small spring depresses the piston so that the upper one-way valve is closed. When the internal pressure is high enough, the piston moves against the force of the small spring and makes the upper one-way valve open, and then the pump can perform better spraying. However, the pumps of this type have some drawbacks such as complicated design, very high precision requirements, and so on.

SUMMARY OF THE INVENTION

The object of the invention is to overcome the drawbacks above and to provide a spring-less lotion pump, which is advantageous to environment protection.

Another object of the invention is to provide a one-way valve, which has a simple design and a very good automatically sealing effect, and to provide a lotion pump, a spray pump, and a cap assembly incorporating the one-way valve.

To achieve the objects, the invention provides a lotion pump, which comprises: a nozzle head; a connecting/guiding member connected with the nozzle head, an upper one-way valve is provided on the connecting/guiding member or the nozzle head; a container cap, which is provided with a connecting structure for connecting to a mouth of a liquid container; a housing, which is connected at its upper end to the container cap and is provided at its lower end with a lower one-way valve; and a piston which is connected with or formed integrally with the connecting/guiding member and makes reciprocating motion in the housing. The lotion pump is not provided with any metal spring, the upper one-way valve includes an elastic tube and a valve seat, the valve seat is disposed on the connecting/guiding member or the nozzle head and has a closed top end and at least one opening provided on a side surface, the elastic tube elastically covers the side surface of the valve seat and hence closes the at least one opening.

Preferably, the lotion pump is connected to a mouth of a liquid container, and the liquid container is fixed to a fixture.

Preferably, the valve seat of the upper one-way valve is provided with at least one projection.

Preferably, the nozzle head is shaped to facilitate being pulled upward and pressed downward.

The invention also provides a spray pump which comprises: a nozzle head; a nozzle disposed in the nozzle head; a piston rod connected with the nozzle head, an upper one-way valve is provided on the piston rod or the nozzle head; a container cap which is provided with a connecting structure for connecting to a mouth of a liquid container; and a housing which is connected at its upper end to the container cap and is provided at its lower end with a lower one-way valve, the piston rod makes reciprocating motion in the housing. The upper one-way valve includes an elastic tube and a valve seat, the valve seat is disposed on the piston rod or the nozzle head and has a closed top end and at least one opening provided on a side surface, the elastic tube elastically covers the side surface of the valve seat and hence closes the at least one opening.

The invention also provides a cap assembly having a one-way valve and used for a soft liquid container, the cap assembly comprises: an end cap; a one-way valve; and a container cap with which the end cap engages and which is to be coupled to a mouth of a liquid container. The one-way valve includes an elastic tube and a valve seat, the valve seat is disposed on the container cap and has a closed top end and at least one opening provided on a side surface, the elastic tube elastically covers the side surface of the valve seat and hence closes the at least one opening.

Preferably, the end cap is hinged integrally with the container cap.

The invention also provides a lotion pump, which comprises: a nozzle head; a piston rod connected with the nozzle head, an upper one-way valve is provided on the piston rod or the nozzle head; a container cap, which is provided with a connecting structure for connecting to a mouth of a liquid container; a housing, which is connected at its upper end to said container cap and is provided at its lower end with a lower one-way valve; and a spring disposed between the piston rod and a bottom of the housing; the piston rod makes reciprocating motion in the housing. The upper one-way valve includes an elastic tube and a valve seat, the valve seat is disposed on the piston rod or the nozzle head and has a closed top end and at least one opening provided on a side surface, the elastic tube elastically covers the side surface of the valve seat and hence closes the at least one opening.

The invention also provides a one-way valve for a fluid container and comprises a elastic tube and a valve seat, the valve seat is disposed on a component and has a closed top end and at least one opening provided on a side surface, the elastic tube elastically covers the side surface of the valve seat and hence closes the at least one opening.

Preferably, the outside surface of the valve seat is provided with at least one projection.

The spring-less lotion pump of the invention can be recycled without a need to break them down. This can greatly simplify the recycle process of used containers. The simplified recycle process is advantageous to reduce material cost, to reduce energy consumption, and to environment protection.

The one-way valve of the invention for use with a fluid container has a remarkably simplified structure and reduced requirements for part precision. The one-way valve of this invention can provide good sealing and leak-proof effects.

The other objects, features and advantages will be apparent from the following description of the invention with reference to the accompanying drawings.

EMBODIMENTS

Now some preferred embodiments are described in detail with reference to the accompanying drawings, in which the same or similar parts are denoted by the same or similar reference numbers.

A spring-less lotion pump 1 according to the first embodiment of the invention is shown in FIG. 1-6. The spring-less lotion pump 1 mainly comprises a nozzle head 2, a container cap 3, a connecting/guiding member 4, a piston 5, a housing 6, an upper one-way valve 7, a lower one-way valve 8, a suction pipe 9 and a gasket 10.

Figures 1, 2:
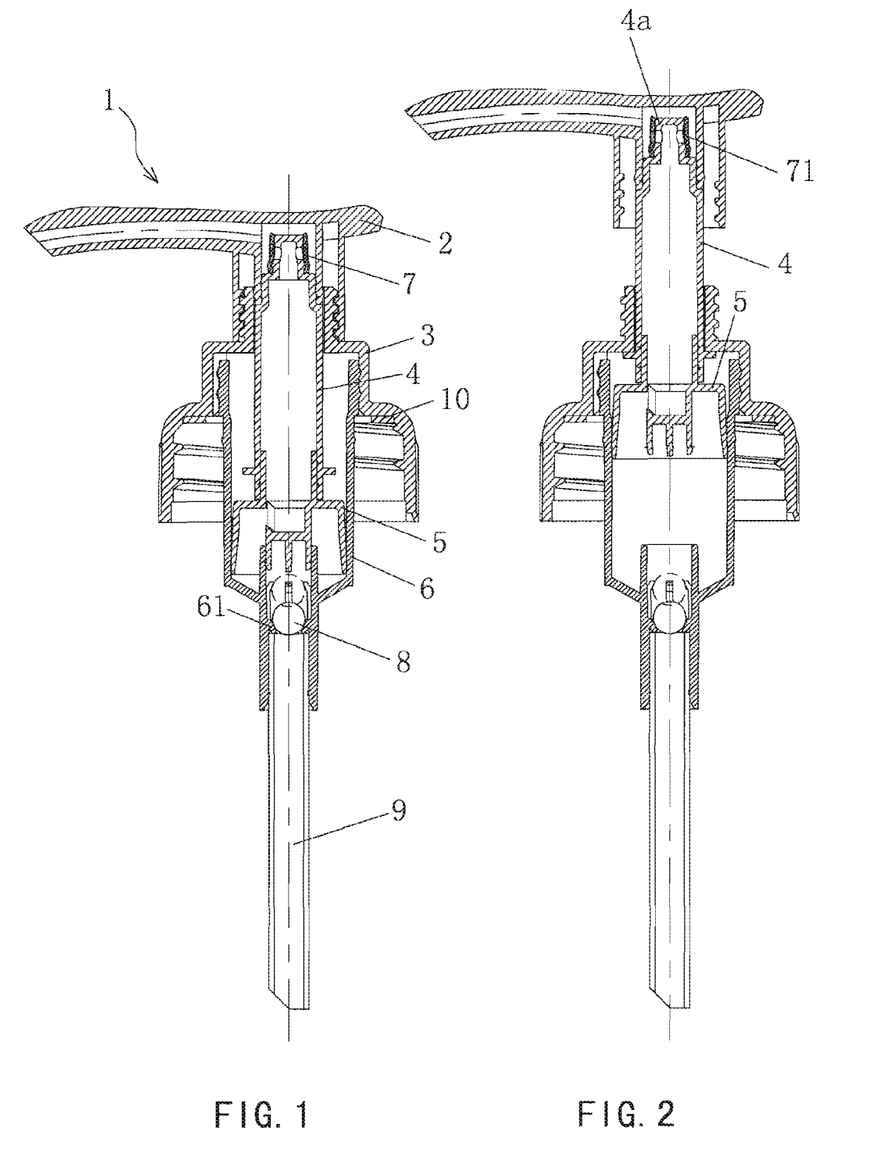
FIG. 1 is a sectional view of a spring-less lotion pump according to the first embodiment of the invention, in which the nozzle head is in a pressed down position.
FIG. 2 is a sectional view of the spring-less lotion pump shown in FIG. 1, but the nozzle head is in a pulled-up position.

FIG. 1 shows the nozzle head 2 that is in a pressed-down position and in a head-locked condition. The so called head-locked condition means that the nozzle head 2 is locked and thereby the lotion pump can not pump out any lotion. This condition facilitates transportation and storage of the lotion pump. The head-locked condition is attained by engaging the internal thread in the nozzle head 2 with the external thread of the container cap 3. FIG. 2 shows a condition in which the nozzle head 2 is released from the head-locked condition and pulled up.

Figure 3:
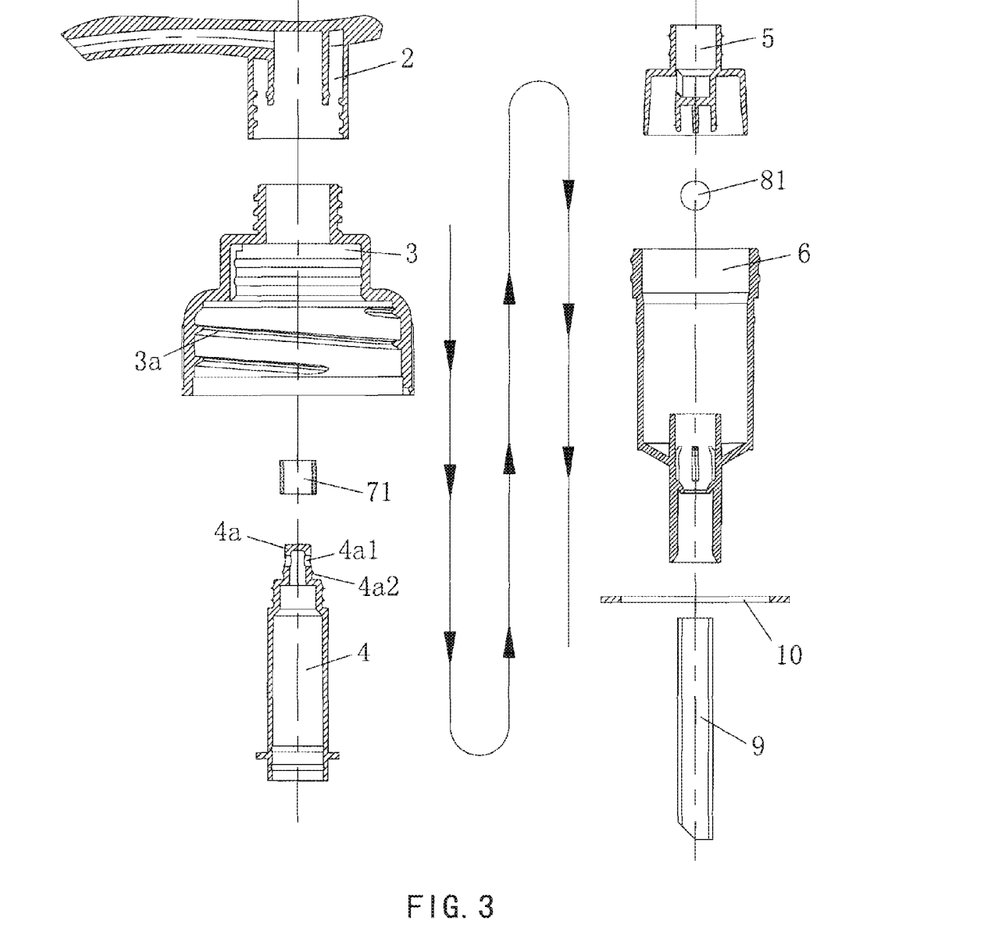
FIG. 3 is an exploded sectional view of the spring-less lotion pump.
Figure 4A:
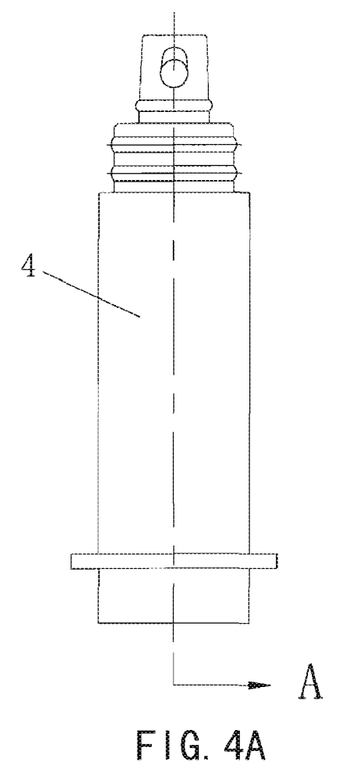
FIG. 4A is a front elevation view of a connecting/guiding member.
Figure 4B:
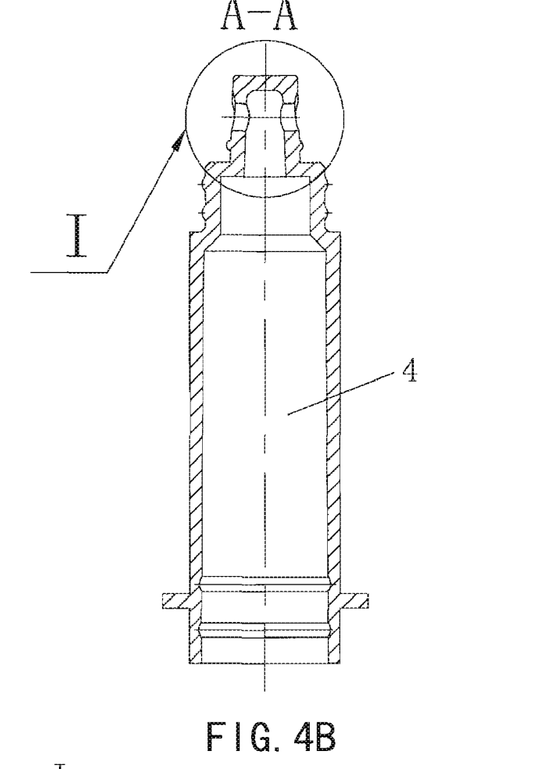
FIG. 4B is a sectional view of the connecting/guiding member taken along line A-A in FIG. 4A.
Figure 4C:
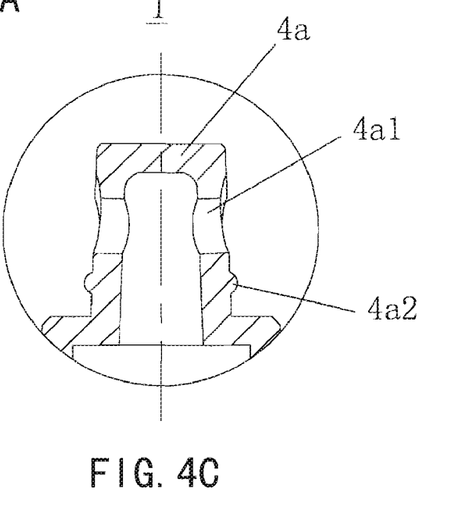
FIG. 4C is an enlarged partial view of the portion I in FIG. 4B.
Figure 5A:
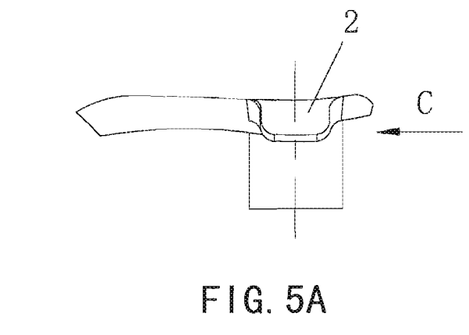
FIGS. 5A and 5B are a side elevation view and a top view of the nozzle head, respectively.
Figure 5B:
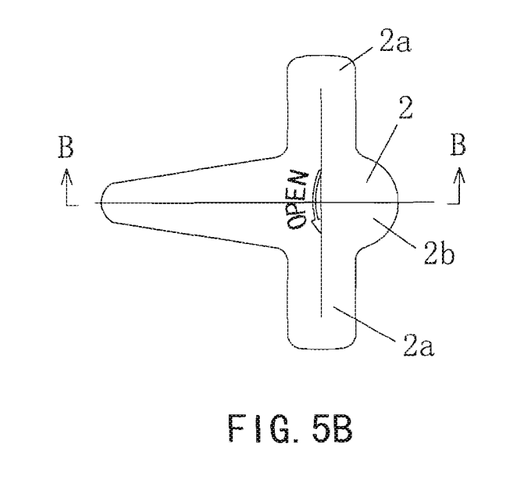
Figure 5C:
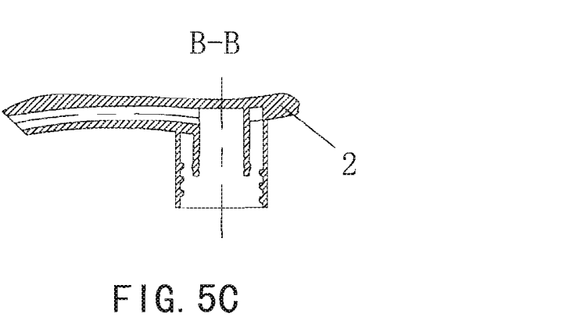
FIG. 5C is a sectional view of the nozzle head taken along line B-B in FIG. 5B.
Figure 5D:
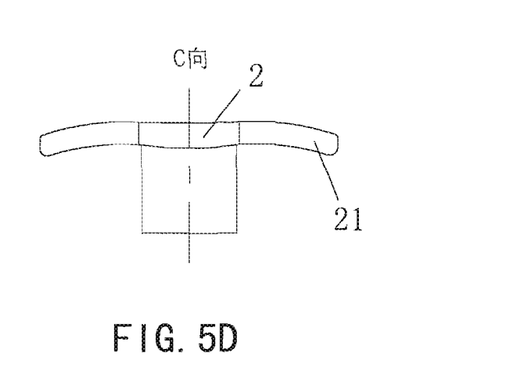
FIG. 5D is a rear view in the direction of arrow C in FIG. 5A.

As shown in FIGS. 1 and 2, the nozzle head 2 is connected with one end of the connecting/guiding member 4. The connecting/guiding member 4 is connected at its other end to the piston 5. The piston 5 can make reciprocating motion in the housing 6. In addition, as shown in FIG. 3, the container cap 3 is connected with the upper end of the housing 6 and is provided with a connecting structure 3a for connecting to a mouth of a liquid container. The connection to a liquid container may be a thread connection or bayonet connection or others. The lower one-way valve 8 is disposed in the lower end of the housing 6. The lower one-way valve 8 includes a ball 81 and a valve seat 61 that is formed integrally with the housing 6.

In addition, the suction pipe 9 is connected with the lower end of the housing 6. Within the container cap 3 is disposed the gasket 10 for creating a good sealing between the lotion pump and the mouth of the liquid container to be coupled.

As its name implies, a great difference between the spring-less lotion pump of the invention and the lotion pumps of the prior art is that the spring-less lotion pump 1 does not have a spring for returning the piston 5. Moreover, a novel upper one-way valve 7 is incorporated in the spring-less lotion pump 1 and is applied to a lotion pump for the first time, and the upper one-way valve 7 can also be extensively used in other containers for fluids, such as the spray pump or the cap assembly to be described hereinafter.

In the spring-less lotion pump 1 of the invention, there is no spring in the housing 6. Therefore, to make the piston 5 move upward and downward in the housing 6, a user should pull up and press down the nozzle head 2 with his/her hand.

Figure 6:
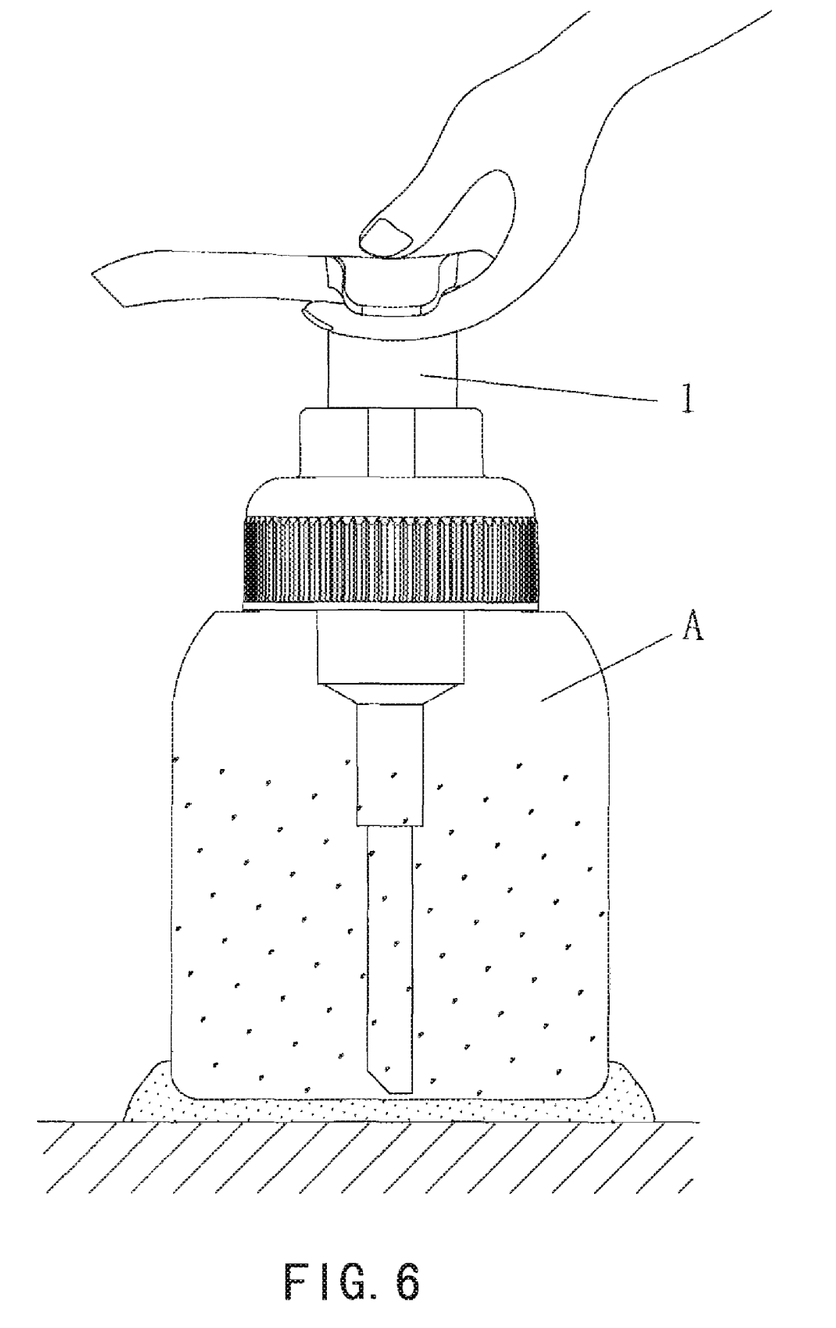
FIG. 6 is a schematic view of a spring-less lotion pump that is mounted on a liquid container.

For easy operation, the nozzle head 2 is preferably formed as facilitating both pulling up and pressing down. As shown in FIG. 5A-5D, the nozzle head 2 can be shaped to be matchable to the fingers. For example, the nozzle head 2 can be made with a trunk 2b and two wings 2a opposite to each other. As shown in FIG. 6, a user can engage the trunk 2b with his/her thumb and engage the two wings 2a with his/her forefinger and middle finger, and then it is easy for him/her to make the nozzle head 2 move up and down.

In addition, also as shown in FIG. 6, in order to make it easy to pull up the nozzle head 2, the liquid container A may preferably be fixed to a fixture, such as a surface of a wall or a surface of a table. For example, as shown in the figure, the liquid container may be fixed to a surface with an adhesive or with a mechanical fixture such as a metal bracket.

A novel upper one-way valve 7 is incorporated in the spring-less lotion pump 1 of the invention. The upper one-way valve 7 includes an elastic tube 71 and a valve seat 4a. Being a part of the connecting/guiding member 4, the valve seat 4a has a closed top end and at least one opening 4a1 provided on a side wall. The elastic tube 71 is placed over the outside surface of the valve seat 4a. Prior to the assembling, the inside diameter of the elastic tube 71 is lightly less than the outside diameter of the valve seat 4a. Therefore, after the assembling, the elastic tube 71 covers elastically the outside surface of the valve seat 4a and closes the opening 4a1. The upper one-way valve 7 is normally in a closed condition. As the internal pressure in the housing 6 is increased to a certain level, the elastic tube 71 is expanded at the opening 4a1 so that a certain amount of lotion is pumped out through the nozzle head 2. The elastic tube 71 re-closes elastically the opening 4a1, thereby stopping the lotion delivery when the internal pressure is reduced to a certain level. In addition, the valve seat 4a is preferably provided with at least one projection 4a2 so as to ensure the elastic tube 71 not to slip off from the valve seat 4a.

The operation of the spring-less lotion pump 1 of the invention will be described as follows. As the nozzle head 2 is pressed downwardly by a user, the internal pressure of the housing 6 is increased to be high enough to open the upper one-way valve 7 and to close the lower one-way valve 8, thereby some lotion being pumped out through the nozzle head 2. In contrast, as the nozzle head 2 is pulled upwardly by a user, the upper one-way valve 7 is closed and the lotion delivery stops while the lower one-way valve 8 is opened, thereby some lotion being suctioned into the pump chamber from the liquid container through the suction pipe 9 and not being pumped out from the nozzle head.

Because of having no a metal spring, the lotion pump of the invention is easy to be recycled and is advantageous to environment protection. Moreover, the spring-less lotion pump 1 is particularly useful to pump out liquid materials which are corrosive to metal spring, for example, to pump out toothpaste containing fluoric ions.

In a lotion pump without a spring, if it still incorporates a conventional one-way valve composed of a ball and a valve seat as an upper one-way valve, there will occurs the following problems. There may be such a case that a user stops operating a lotion pump while its nozzle head has not been pressed to the lower stop point. In this case, since the upper one-way valve must be left in an opened position, the piston will slowly goes down due to the gravities of its own, the nozzle head, the connecting/guiding member and the lotion within them, thereby there will be some lotion slowly dripping out of the nozzle of the nozzle head. However, in a lotion pump having a spring, there will not be a drawback like this, since the spring will always force the piston in the uppermost position.

In the case of a spray pump in the prior art, above its piston is additionally disposed a small spring, which forces the piston in the lowermost position so as to keep the one-way valve being closed. The upper one-way valve can be opened only when the internal pressure in the pump chamber is increased to be high enough to move the piston upwardly against the force of the small spring. However, this still uses a spring and is impossible to achieve the goal of no spring.

Since the present invention conceives a novel design of a one-way valve for use with liquid contents, it is possible to achieve a "spring-less design" while overcoming the above-mentioned problem of the lotion dripping.

Figure 7:
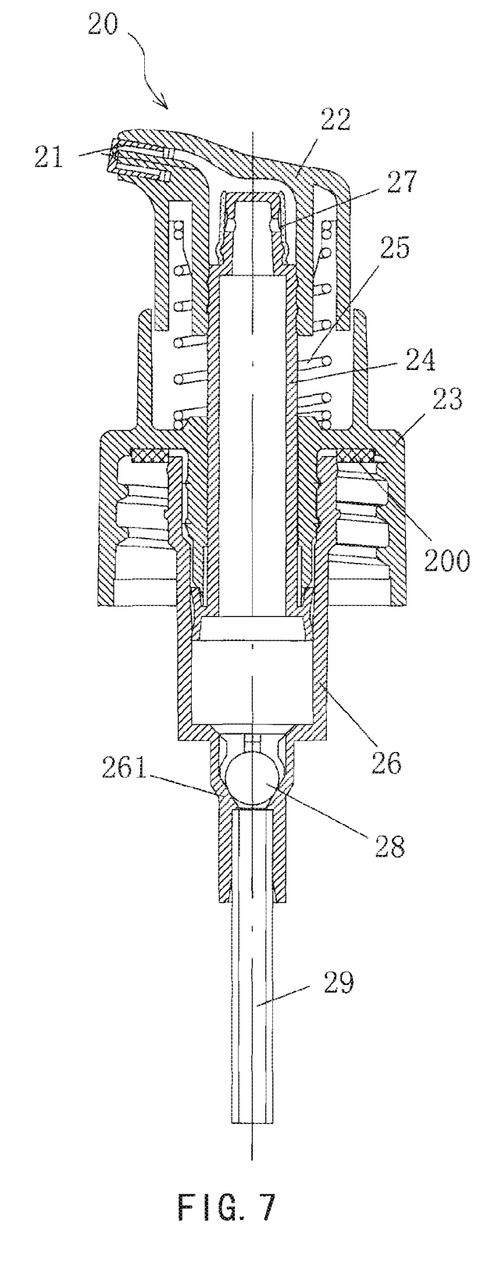
FIG. 7 is a sectional view of a spray pump according to the second embodiment of the invention, in which the nozzle head is not in a pressed-down position.
Figure 8:
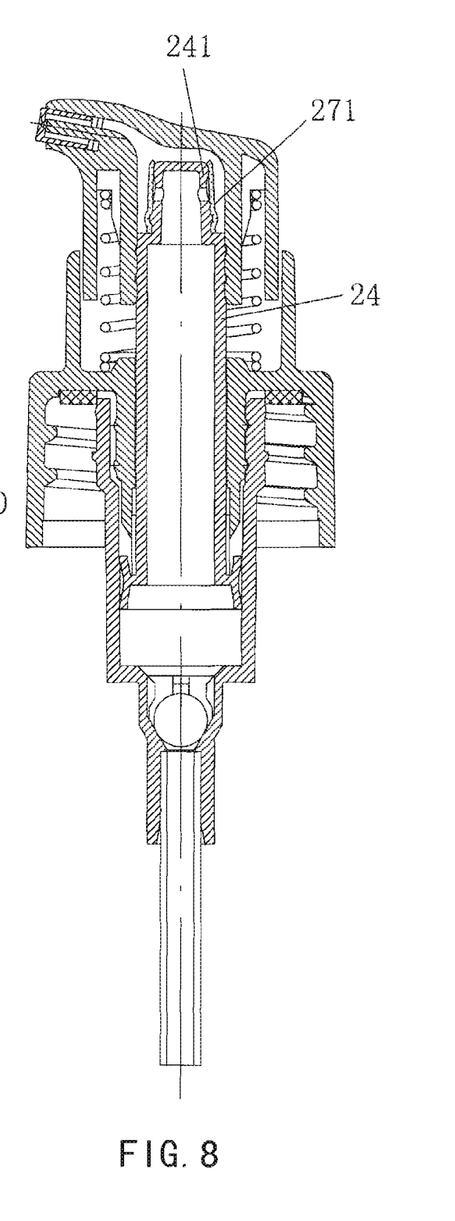
FIG. 8 is a sectional view of the spray pump, in which the nozzle head is in a pressed-down position.
Figure 9:
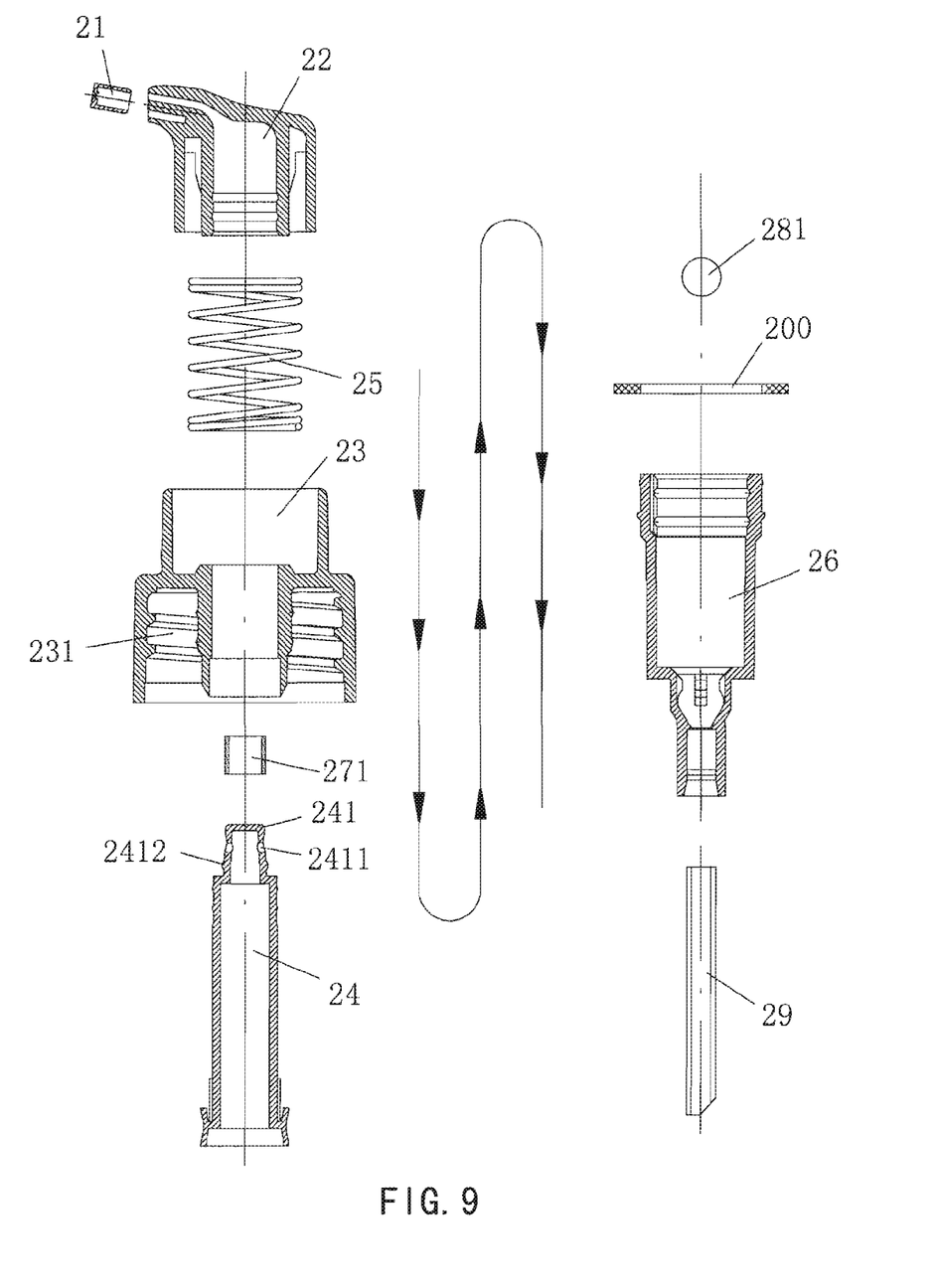
FIG. 9 is an exploded sectional view of the spray pump.

FIGS. 7-9 show a spray pump 20 according to the second embodiment of the invention. The spray pump 20 mainly comprises a nozzle 21, a nozzle head 22, a container cap 23, a piston rod 24, a return spring 25, a housing 26, an upper one-way valve 27, a lower one-way valve 28, a suction pipe 29 and a gasket 200.

In FIG. 7, the nozzle head 22 is shown in an uppermost position, and in FIG. 8, it is in a pressed-down position. As shown in the Figs., the nozzle 21 is disposed in the front end of the nozzle head 22. The nozzle head 22 is connected with one end of the piston rod 24. The piston rod 24 can make reciprocating motion in the housing 26. The container cap 23 is connected with the upper end of the housing 26 and has a connecting structure 231 for connecting to the mouth of a liquid container. The spring 25 is disposed between the nozzle head 22 and the container cap 23 so as to make the piston rod 24 and nozzle head 22 return after their being pressed. The lower one-way valve 28, which is disposed in the lower end of the housing 26, includes a ball 281 and a valve seat 261 which is formed integrally with the housing 26.

Further, the suction pipe 29 is connected with the lower end of the housing 26. Within the container cap 3 is disposed the gasket 10 for creating a good sealing between the spray pump and the mouth of a liquid container to be coupled.

The spray pump 20 is characterized in that it incorporates an upper one-way valve 27 of the present invention, which is similar to the upper one-way valve 7 in the spring-less lotion pump 1 described above. The upper one-way valve 27 includes an elastic tube 271 and a valve seat 241. Being a part of the piston rod 24, the valve seat 241 has a closed top end and at least one opening 2411 provided on a side surface. The elastic tube 271 elastically covers the side surface and closes the opening 2411. Further, the valve seat 241 is preferably provided with at least one projection 2412 so as to ensure the elastic tube 271 not to slip off from the valve seat 241.

For a spray pump, the higher the internal pressure is, the better the atomization effect is. Being provided with the upper one-way valve 27 of the invention, the spray pump 20 can generate a much higher internal pressure in its chamber without a need to additionally provide a small spring for forcing the piston to go downward. A stronger constraining force of the elastic tube 271 will result in a higher internal pressure in the pump chamber and a better atomization effect.

In FIG. 10A-10D is shown a cap assembly 30 according to the third embodiment of the invention, which can be used for a soft liquid container such as a toothpaste tube. The cap assembly 30 mainly comprises an end cap 31, a one-way valve 32 and a container cap 33. The end cap 31 is thread-engaged with the container cap 33, and the container cap 33 is to be connected to the mouth of a liquid container. Similar to the one-way valves in the above two embodiments, the one-way valve 32 includes a valve seat 331 and an elastic tube 321. The valve seat 331 is formed integrally with the container cap 33, the valve seat 331 has a closed top end and at least one opening provided on a side surface. The elastic tube 71 elastically covers the side surface of the valve seat 331 and closes the opening thereon. Further, the valve seat 331 is preferably provided with at least one projection so as to ensure the elastic tube 321 not to slip off from the valve seat 331.

Figure 10A:
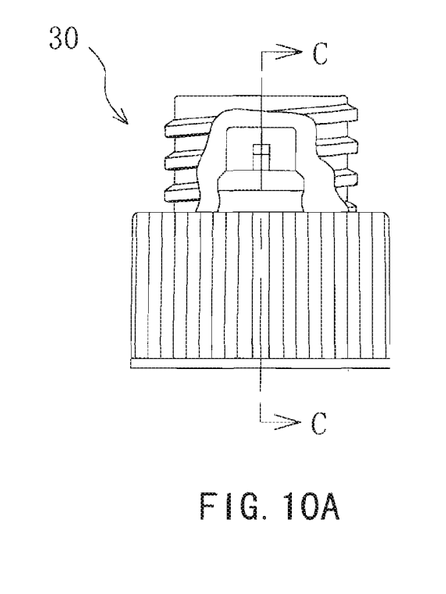
FIG. 10A is a front elevation view of a cap assembly with a one-way valve according to the third embodiment of the invention.
Figure 10B:
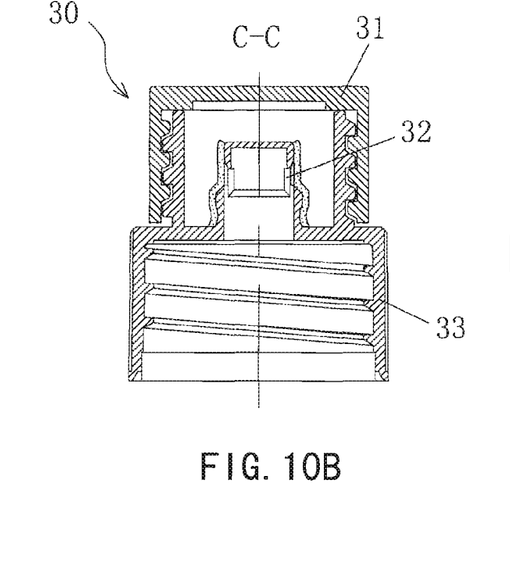
FIG. 10B is a sectional view of the cap assembly taken along line C-C in FIG. 10A.
Figure 10C:
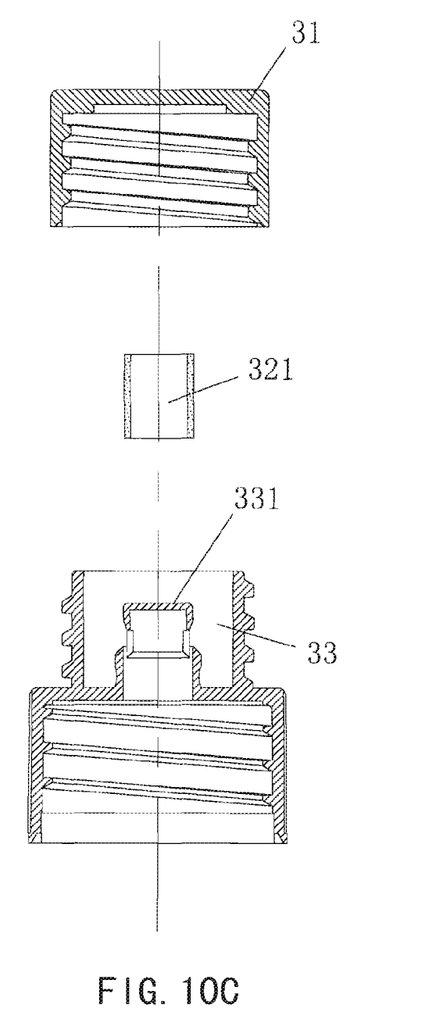
FIG. 10C is an exploded sectional view of the cap assembly.

In use, a user turns down the end cap 31, and then squeezes the soft liquid container with his/her hand. As the internal pressure in the liquid container is increased to a high level to expand the elastic tube 321, some contents will be discharged through the opening of the valve seat 331. As the internal pressure reduces to a certain level, the elastic tube 321 returns to its original shape and the one-way valve 32 automatically closes. Thus, the contents in the liquid container are kept being isolated from the air, and hence the water in the contents will not evaporate, no leakage will take place, and the liquid container can be kept in a certain vacuum condition.

Figure 11:
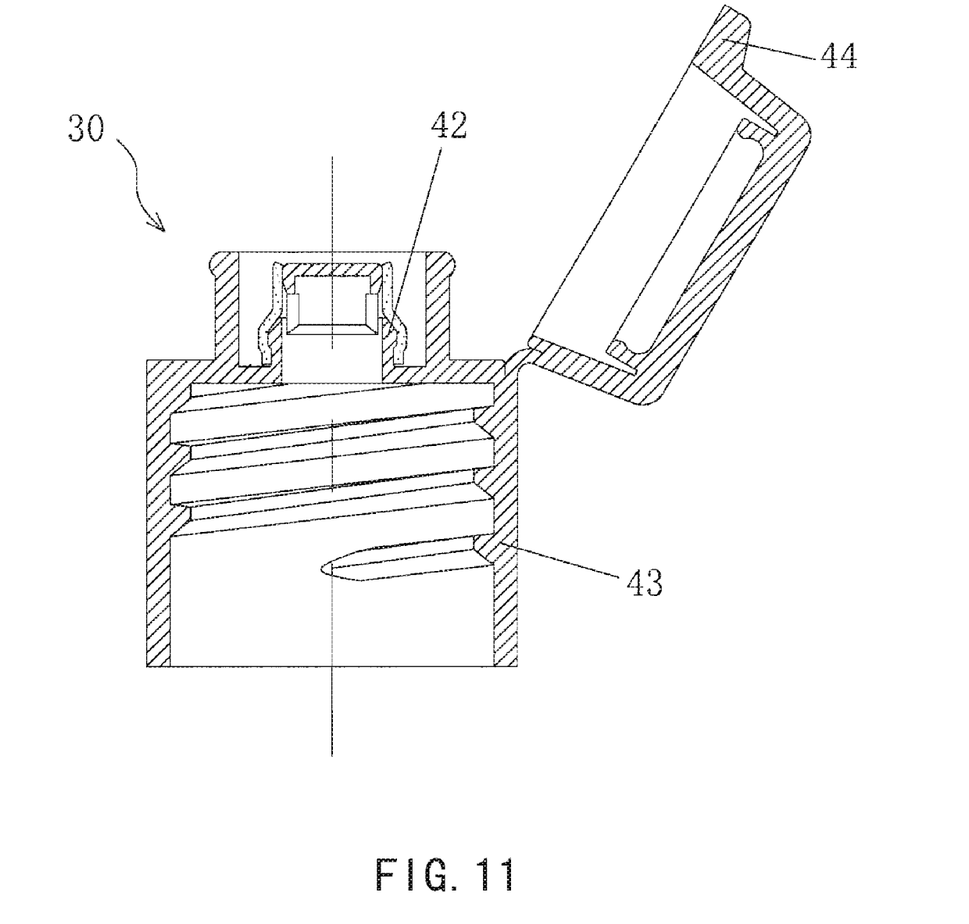
FIG. 11 is a sectional view of a hinged cap assembly according to the fourth embodiment of the invention.

In FIG. 11 is shown a hinged cap assembly 40 of the fourth embodiment according to the invention, which can be used for a soft liquid container such as a toothpaste tube. Generally similar to the cap assembly of the third embodiment, the cap assembly 40 includes an end cap 41, a one-way valve 42 and a container cap 43. The difference of the cap assembly 40 from the cap assembly 30 of the third embodiment is that the end cap 41 is formed integrally with the container cap 43 via a hinge portion.

Figure 12:
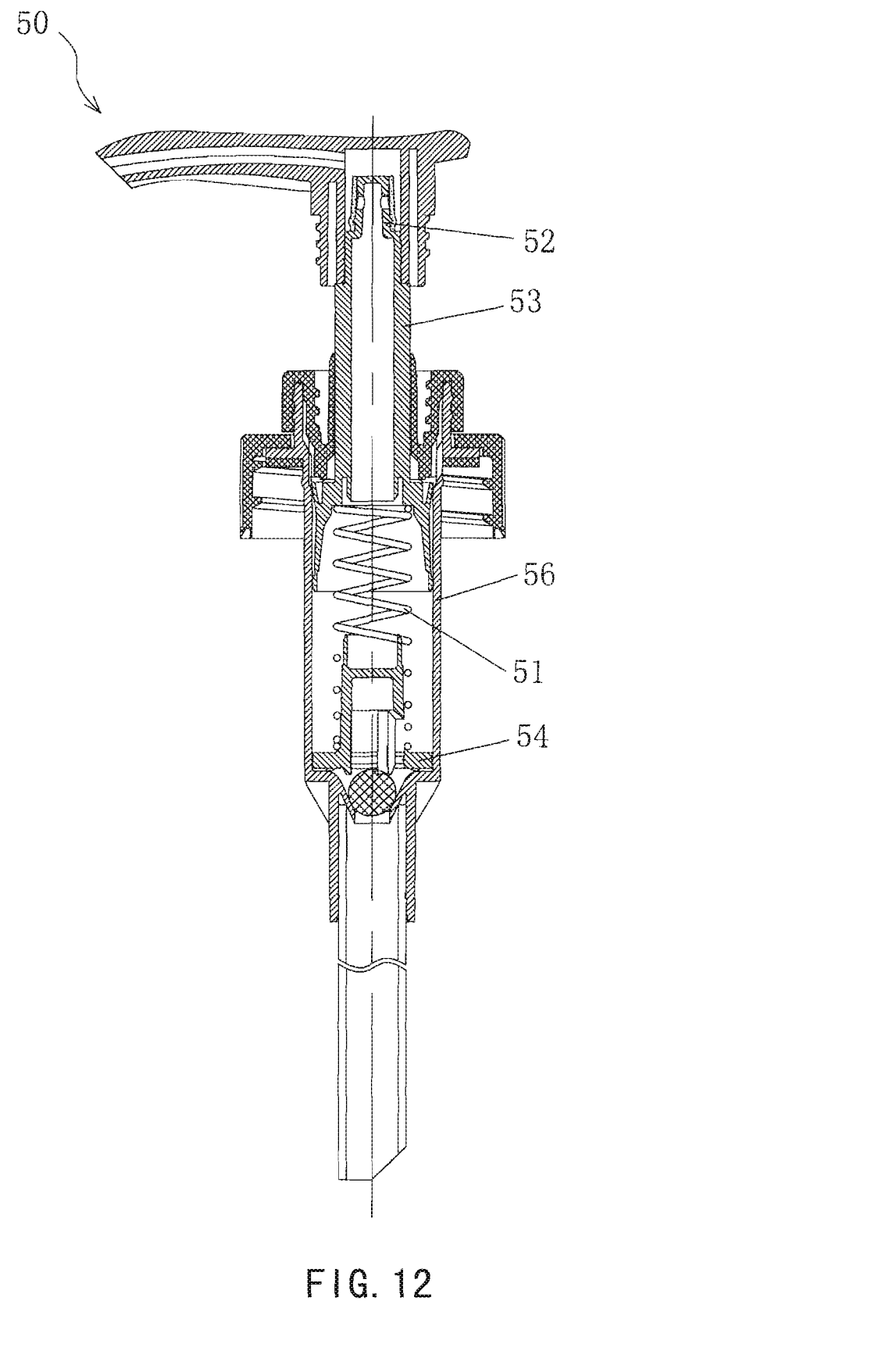
FIG. 12 is sectional view of a lotion pump with a spring according to the fifth embodiment of the invention.

In FIG. 12 is shown a spring lotion pump 50 according to the fifth embodiment of the invention. The lotion pump 50 has a spring 51 disposed between a piston rod 53 and a spring seat 54. It is also possible to simply use the bottom of the housing 56 as a spring seat. The structure of the pump 50 is similar to the conventional ones. It differs from the lotion pump of the first embodiment in that a spring 51 is incorporated therein. The lotion pump is characterized in that it adopts the one-way valve 52 of the invention. The composition and operation principle of the one-way valve 52 is identical to those described above. When the one-way valve of this invention is used in a conventional spring lotion pump, it can reduce ineffective press times of the pump and make the pump leak-proof in an opened condition.

Figures 13A, 13B, 13C:
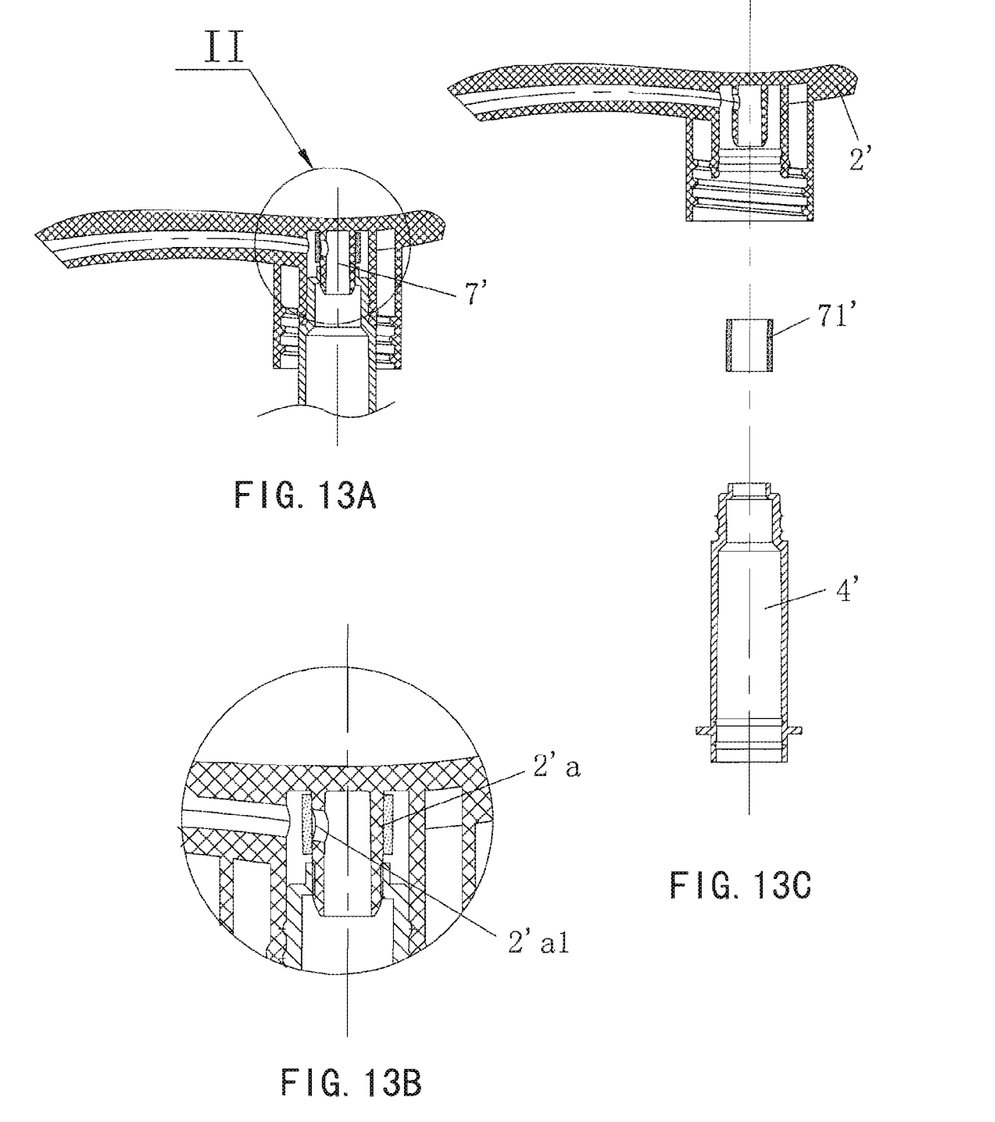
FIG. 13A is a sectional view of a spring-less lotion pump which incorporates a modified one-way valve.
FIG. 13B is an enlarged partial view of the portion II in FIG. 13A.
FIG. 13C is an exploded sectional view of the spring-less lotion pump which incorporates a modified one-way valve.

In FIG. 13A-13C is shown a spring-less lotion pump with a modified one-way valve 7'. The modified upper one-way valve 7' includes an elastic tube 71' and a valve seat 2'a. Unlike the embodiments described above, the valve seat 2'a is a part of the nozzle head. The valve seat 2'a has a closed top end and an opening 2'a1 provided on a side surface. The opening 2'a1 preferably faces toward the nozzle. The lower end of the valve seat 2'a is opened and connected hermetically to a connecting/guiding member 4'. It should be appreciated that in addition to being incorporated in the spring-less lotion pump 1 of the first embodiment, the modified upper one-way valve is also applicable to the spray pump and the spring pump of the second and the fifth embodiments, that is, the valve seat is formed integrally with the nozzle head and is connected to the piston rod.

Figures 14A, 14B, 14C:
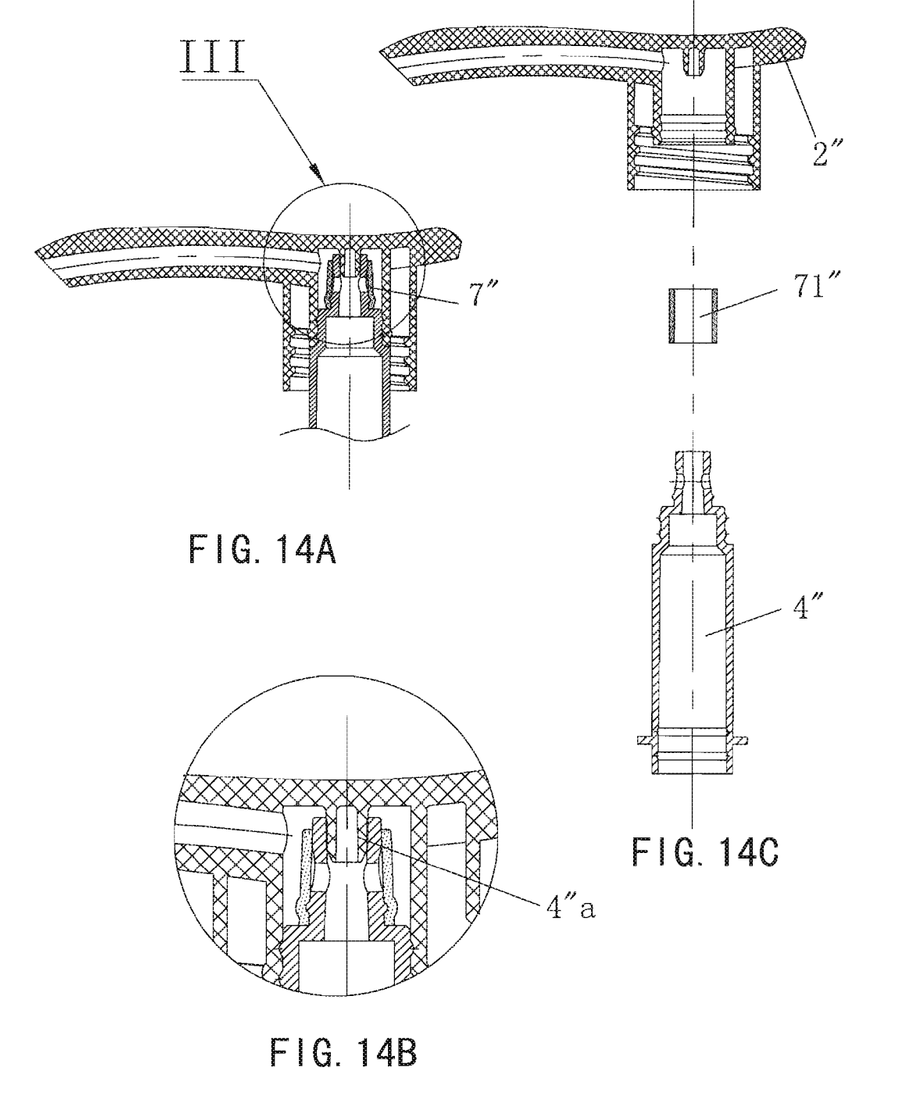
FIG. 14A is a sectional view of a spring-less lotion pump which incorporates another modified one-way valve.
FIG. 14B is an enlarged partial view of the portion III in FIG. 14B.
FIG. 14C is an exploded sectional view of the spring-less lotion pump which incorporates said another modified one-way valve.

In FIG. 14A-14C is shown a spring-less lotion pump with another modified one-way valve 7". The modified upper one-way valve 7" includes an elastic tube 71" and a valve seat 4"a. The valve seat 4"a is a part of the connecting/guiding member 4". Unlike the embodiments described above, the top end of the valve seat 4"a is opened, but it becomes a closed top end by hermetically connecting with the nozzle head 2". Thus, the feature "having a closed top end" covers both the case that the top end is closed by itself and the case that the top end is closed by other element(s). Also, the modified one-way valve is also applicable to the spray pump and the spring pump of the second and the fifth embodiments.

While the invention has been described in detail in conjunction with the preferred embodiments, it should be understood that those skilled person in the art can make various equivalent changes and modifications without departing from the above teaching and the spirit of the invention. For example, the connection or fixation between the elements of the lotion pump can be effected in various manners; the connecting/guiding member and piston can be formed integrally; the valve seat of the one-way valve can be formed integrally with other elements or formed separately. Therefore, the scope of the invention is defined by the claims appended hereto.

The invention claimed is:

1. A lotion pump comprising:
a nozzle head;
a nozzle provided on the nozzle head;
a passage formed in said nozzle;
a connecting/guiding member connected with said nozzle head, an internal space of said connecting/guiding member and said passage in said nozzle forming a lotion passage, an upper one-way valve provided on said connecting/guiding member, said upper one-way valve positioned in the lotion passage between the internal space of said connecting/guiding member and said passage in said nozzle and having an open state and a closed state;
a container cap with a connecting structure for connecting to a mouth of a liquid container;
a housing having an upper end and an lower end, with the upper end connected to said container cap and the lower end connected to a lower one-way valve; and
a piston, which is connected with or formed integrally with said connecting/guiding member and makes reciprocating motion in said housing,
wherein said lotion pump is not provided with any spring, said upper one-way valve includes a cylindrical-shaped elastic tube and a valve seat, said valve seat is disposed on said connecting/guiding member and has a closed top end and at least one opening provided on a side surface, said elastic tube elastically covers the side surface of said valve seat and the at least one opening provided on the side surface, the at least one opening is in fluid communication with the internal space of the connecting/guiding member;
wherein when said upper one-way valve is in the open state, the cylindrical-shaped elastic tube expands to form a gap between said elastic tube and the side surface so as to allow lotion to flow from the internal space of said connecting/guiding member to said passage of said nozzle through the at least one opening and the gap, and when said upper one-way valve is in the closed state, the cylindrical-shaped elastic tube closes said at least one opening so as to stop lotion from flowing between the internal space of said connecting/guiding member and the passage in said nozzle; and
wherein said lotion pump is connected to the mouth of said liquid container, said lower one-way valve is in fluid communication with said liquid container, and the liquid container is fixed to a fixture.

2. The lotion pump of claim 1, wherein said valve seat of said upper one-way valve is provided with at least one projection.

3. The lotion pump of claim 1, wherein said nozzle head is shaped to facilitate being pulled upward and pressed downward.

4. A lotion pump comprising:
a nozzle head;
a nozzle provided on the nozzle head;
a passage formed in said nozzle;
a piston rod connected with said nozzle head, an internal space of said piston rod and said passage in said nozzle forming a lotion passage, an upper one-way valve is provided on said piston rod, said upper one-way valve positioned in the lotion passage between the internal space of said piston rod and said passage in said nozzle and having an open state and a closed state;

a container cap, which is provided with a connecting structure for connecting to a mouth of a liquid container;

a housing, which is connected at its upper end to said container cap and is provided at its lower end with a lower one-way valve; and a spring disposed between said piston rod and a bottom of said housing; said piston rod makes reciprocating motion in said housing, wherein said upper one-way valve includes a cylindrical-shaped elastic tube and a valve seat, said valve seat is disposed on said piston rod or said nozzle head and has a closed top end and at least one opening provided on a side surface, said elastic tube elastically covers the side surface of said valve seat and the at least one opening provided on the side surface, the at least one opening is in fluid communication with the internal space of the piston, and wherein when said upper one-way valve is in the open state, the cylindrical-shaped elastic tube expands to form a gap between said elastic tube and the side surface so as to allow lotion to flow from the internal space of said piston rod to said passage of said nozzle through the at least one opening and the gap, and when said upper one-way valve is in the closed state, the cylindrical-shaped elastic tube closes said at least one opening so as to stop lotion from flowing between the internal space of said piston rod and the passage in said nozzle.

* * * * *